(12) United States Patent
Kobayashi

(10) Patent No.: US 11,029,956 B2
(45) Date of Patent: Jun. 8, 2021

(54) PROCESSOR AND INFORMATION PROCESSING SYSTEM FOR INSTRUCTIONS THAT DESIGNATE A CIRCULAR BUFFER AS AN OPERAND

(71) Applicant: SONY SEMICONDUCTOR SOLUTIONS CORPORATION, Kanagawa (JP)

(72) Inventor: Hiroshi Kobayashi, Kanagawa (JP)

(73) Assignee: SONY SEMICONDUCTOR SOLUTIONS CORPORATION, Kanagawa (JP)

(*) Notice: Subject to any disclaimer, the term of this patent is extended or adjusted under 35 U.S.C. 154(b) by 0 days.

(21) Appl. No.: 16/639,228

(22) PCT Filed: Jul. 6, 2018

(86) PCT No.: PCT/JP2018/025667
§ 371 (c)(1),
(2) Date: Feb. 14, 2020

(87) PCT Pub. No.: WO2019/039113
PCT Pub. Date: Feb. 28, 2019

(65) Prior Publication Data
US 2020/0201641 A1    Jun. 25, 2020

(30) Foreign Application Priority Data
Aug. 24, 2017  (JP) .............................. JP2017-160812

(51) Int. Cl.
*G06F 9/30*    (2018.01)
*G06T 1/20*    (2006.01)

(52) U.S. Cl.
CPC ........ *G06F 9/30145* (2013.01); *G06F 9/3016* (2013.01); *G06F 9/30036* (2013.01);
(Continued)

(58) Field of Classification Search
None
See application file for complete search history.

(56) References Cited

U.S. PATENT DOCUMENTS 5,249,148 A * 9/1993 Catherwood ............. G06F 5/10
708/491
5,416,847 A * 5/1995 Boze ...................... H04H 60/04
381/94.3
(Continued)

FOREIGN PATENT DOCUMENTS

EP   0696772 A2   2/1996
GB   2558220 A *  7/2018 ........... G06F 9/3013
(Continued)

OTHER PUBLICATIONS

'Efficient Implementation of Tap Delay Line Filter Using High Speed Digital Signal Processor' by Muhammad Imran Akram et al., 2012 IEEE. (Year: 2012).*
(Continued)

*Primary Examiner* — Steven G Snyder
(74) *Attorney, Agent, or Firm* — Chip Law Group

(57) ABSTRACT

Data is supplied in a circular manner and overlapping memory accesses is suppressed in a processor. The processor includes a circular buffer and an instruction executing part. The circular buffer has a function of holding a plurality of pieces of data and reading the plurality of pieces of data in circulation. The instruction executing part executes an instruction that designates the circular buffer as an operand. That is, this processor has an instruction that designates the circular buffer as an operand, as an instruction set. With this configuration, the data is supplied in a circular manner from the circular buffer in the execution of the instruction by the processor.

10 Claims, 10 Drawing Sheets

(52) U.S. Cl.
CPC ...... *G06F 9/30043* (2013.01); *G06F 9/30134* (2013.01); *G06T 1/20* (2013.01)

(56) References Cited

U.S. PATENT DOCUMENTS

| | | | |
|---|---|---|---|
| 5,655,132 A | 8/1997 | Watson | |
| 5,739,691 A * | 4/1998 | Hoenninger, III | G01R 33/3621 324/307 |
| 6,052,766 A * | 4/2000 | Betker | G06F 9/30098 711/200 |
| 6,721,867 B2 * | 4/2004 | Launiainen | G06F 9/30032 711/109 |
| 7,068,780 B1 * | 6/2006 | Levonas | H04B 3/23 370/268 |
| 7,721,069 B2 * | 5/2010 | Ramchandran | G06F 9/3828 712/34 |
| 8,051,226 B2 * | 11/2011 | Moyer | G06F 9/3013 710/52 |
| 8,060,724 B2 * | 11/2011 | Moyer | G06F 9/30036 711/214 |
| 8,386,751 B2 * | 2/2013 | Ramchandran | G06F 1/3203 712/34 |
| 8,880,850 B2 * | 11/2014 | Ramchandran | G06F 15/8053 712/34 |
| 10,313,097 B2 * | 6/2019 | Zheng | G06F 9/46 |
| 2002/0166037 A1 * | 11/2002 | Launiainen | G06F 9/30043 711/201 |
| 2005/0283589 A1 | 12/2005 | Matsuo | |
| 2006/0015703 A1 * | 1/2006 | Ramchandran | G06F 9/3895 712/34 |
| 2007/0198901 A1 * | 8/2007 | Ramchandran | G06F 7/724 714/781 |
| 2007/0294511 A1 * | 12/2007 | Ramchandran | G06F 15/7842 712/34 |
| 2009/0313442 A1 * | 12/2009 | Moyer | G06F 9/30112 711/154 |
| 2010/0042808 A1 * | 2/2010 | Moyer | G06F 9/30145 712/22 |
| 2011/0131393 A1 * | 6/2011 | Ramchandran | G06F 9/30036 712/37 |
| 2011/0270491 A1 * | 11/2011 | Kincaid | B60R 21/01512 701/45 |
| 2013/0101010 A1 * | 4/2013 | Casas | H04L 25/03318 375/233 |
| 2013/0238878 A1 * | 9/2013 | Ramchandran | G06F 9/30014 712/34 |
| 2014/0351551 A1 * | 11/2014 | Doerr | G06F 9/30181 711/204 |
| 2017/0116495 A1 | 4/2017 | Nomura et al. | |
| 2019/0369995 A1 * | 12/2019 | Botman | G06F 9/30112 |

FOREIGN PATENT DOCUMENTS

| | | |
|---|---|---|
| JP | 02-302169 A | 12/1990 |
| JP | 08-063361 A | 3/1996 |
| JP | 11-102282 A | 4/1999 |
| JP | 2006-004042 A | 1/2006 |
| JP | 2006-154979 A | 6/2006 |
| JP | 2017-079017 A | 4/2017 |

OTHER PUBLICATIONS

'Circular Buffer: A Critical Element of Digital Signal Processors' Nov. 13, 2017 by Steve Arar. (Year: 2017).*

'The Scientist and Engineer's Guide to Digital Signal Processing' by Steven W. Smith, Ph.D., copyright 1997-2011 by California Technical Publishing. (Year: 2011).*

'FIR Filter Implementation' by David Waldo, Aug. 27, 2013. (Year: 2013).*

International Search Report and Written Opinion of PCT Application No. PCT/JP2018/025667, dated Sep. 4, 2018, 09 pages of ISRWO.

* cited by examiner

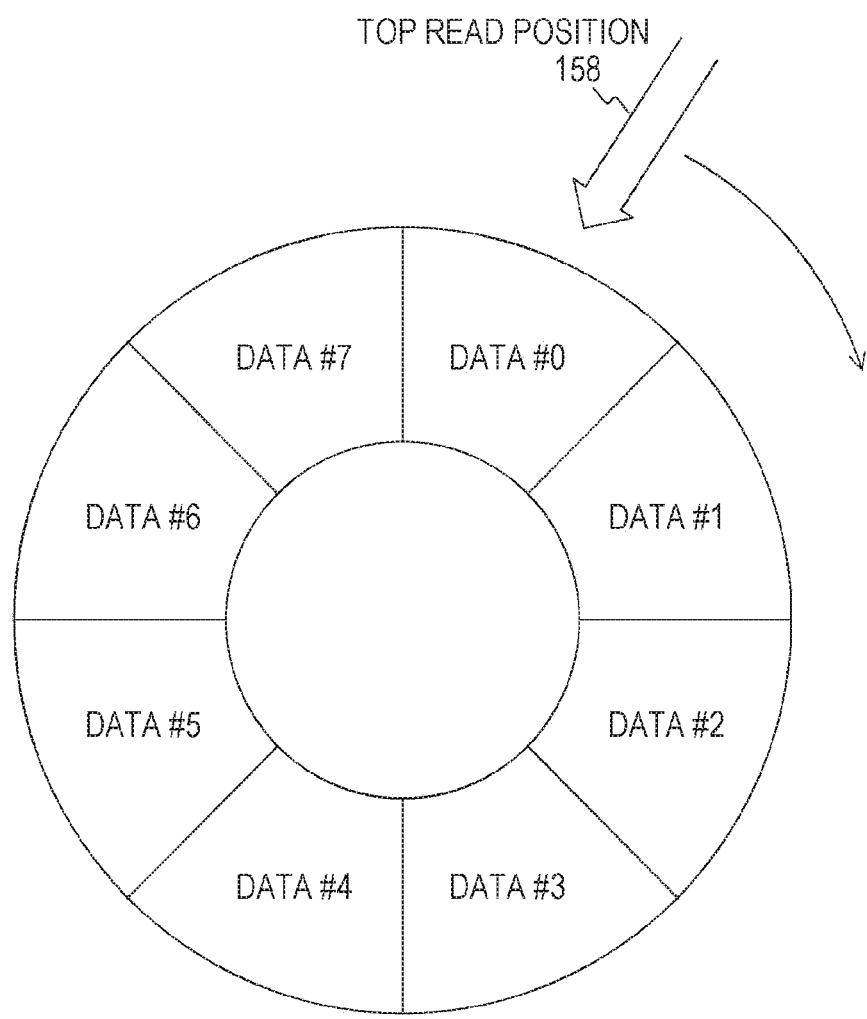

FIG. 5

| INSTRUCTION FORMAT | DEFINITION |
| --- | --- |
| LD BUFn size [address] | DATA WITH AMOUNT OF "size" WORDS IS LOADED FROM ADDRESS OF MEMORY "address" INTO RING BUFFER #n (NON-BLOCKING WORKING) |
| LD BUFn +size | DATA WITH AMOUNT OF "size" WORDS IS ADDITIONALLY LOADED FROM MEMORY TO RING BUFFER #n (NON-BLOCKING WORKING) |
| ST BUFn size [address] | DATA WITH AMOUNT OF "size" WORDS IS STORED FROM RING BUFFER #n TO ADDRESS OF MEMORY "address" (NON-BLOCKING WORKING) |
| MOV BUFn Rn | DATA IS TRANSFERRED FROM GENERAL-PURPOSE REGISTER Rn TO RING BUFFER #n |
| MOV Rn BUFn | DATA IS TRANSFERRED FROM RING BUFFER #n TO GENERAL-PURPOSE REGISTER Rn |
| MAC Rn BUFi BUFj | MULTIPLY-ADD OPERATION RESULT OF BUFi AND BUFj IS SAVED IN Rn<br>$Rn \leftarrow Rn + BUFi \times BUFj$ |

FIG. 6 in_data → BUF1

| 1 | 2 | 2 | 3 | 2 | 2 |
|---|---|---|---|---|---|
| 1 | 2 | 3 | 2 | 1 | 1 |
| 2 | 3 | 9 | 2 | 1 | 1 |
| 1 | 2 | 2 | 1 | 2 | 2 |
| 1 | 1 | 2 | 2 | 3 | 3 |
| 1 | 1 | 2 | 2 | 3 | 3 | coef → BUF0

$$\times \begin{vmatrix} -1 & -1 & -1 \\ -1 & 9 & -1 \\ -1 & -1 & -1 \end{vmatrix}$$

| -5 | 2 | -5 | -5 |
|---|---|---|---|
| 5 | 64 | -3 | -3 |
| -3 | -4 | -14 | 3 |
| -3 | 5 | 1 | 9 | out_data → BUF2

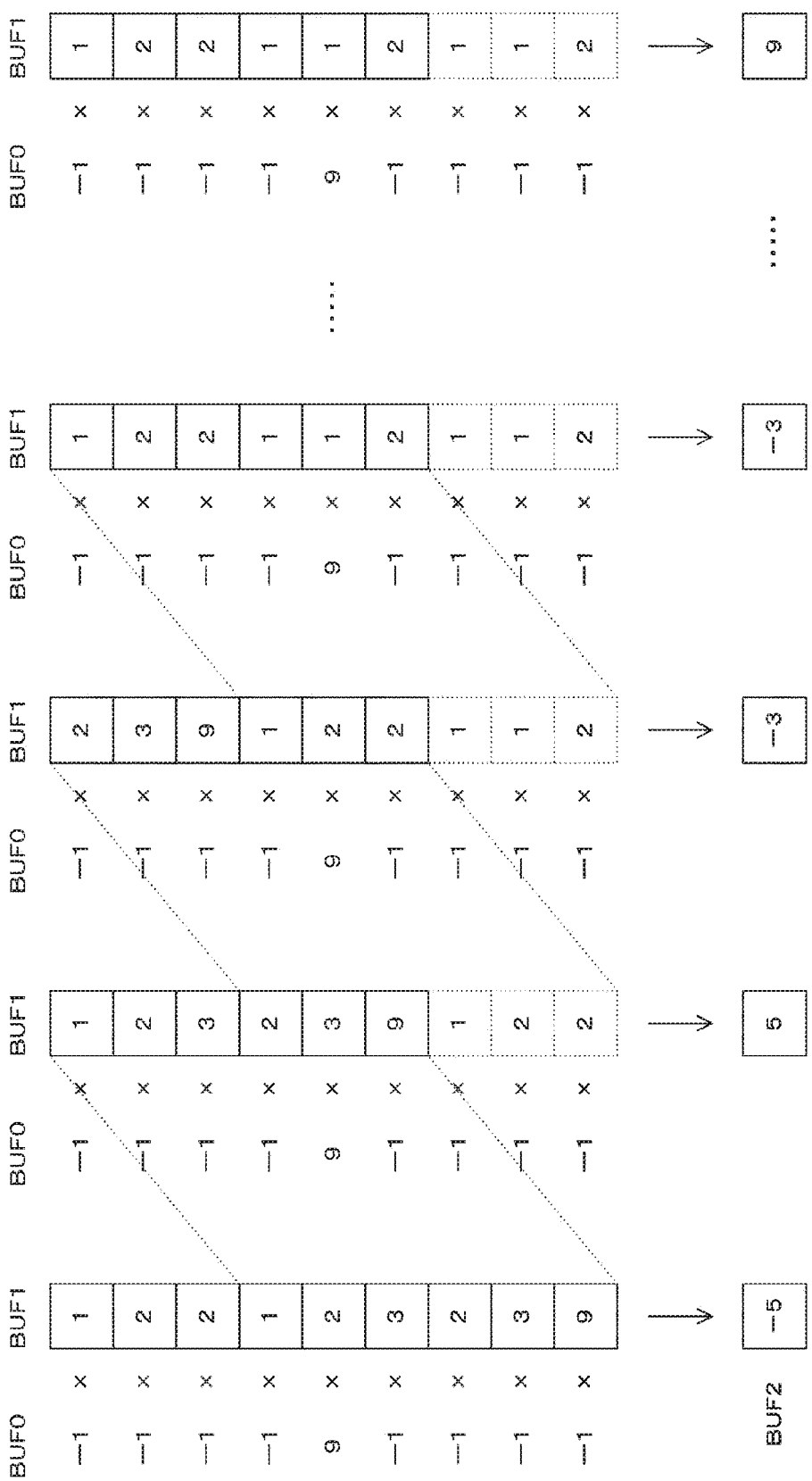

FIG. 8

```
1  BEGIN:    LD BUF0 #9 [#coef]    // LOAD NINE FILTER COEFFICIENTS INTO RING BUFFER #0

2            MOV R0 #in_data       // SET LOAD POINTER IN R0

3            LD BUF1 #9 [R0]       // LOAD DATA (BUFFER SIZE = 9) INTO RING BUFFER #1

4            MOV R1 #out_data      // SET STORE POINTER IN R1

5            ST BUF2 [R1]          // STORE DATA (BUFFER SIZE = ∞) FROM RING BUFFER #2

6            MOV R2 #16            // SET LOOP COUNTER FOR NUMBER OF PIECES OF OUTPUT DATA (16) IN R2

7  LOOP_16:  MOV R3 #9             // SET LOOP COUNTER FOR NUMBER OF 3×3 FILTER OPERATIONS IN R3

8            MOV R4 #0             // CLEAR R4 TO ZERO

9  LOOP_9:   MAC R4 BUF0 BUF1      // FILTER OPERATION: R4 = R4 + BUF0 × BUF1

10           DEC R3                // DECREMENT R3, WHICH IS LOOP COUNTER FOR NUMBER OF FILTER OPERATIONS (#9)

11           BNZ LOOP_9            // BRANCH TO LOOP_9 UNLESS LOOP COUNTER R3 IS ZERO

12           MOV BUF2 R4           // TRANSFER FILTER OPERATION RESULT R4 TO RING BUFFER #2

13           MOD R5 R2 #4          // SET REMAINDER OBTAINED BY DIVIDING LOOP COUNTER R2 FOR NUMBER OF PIECES OF
                                   //    OUTPUT DATA BY FOUR IN R5

14           BNZ JUMP_0            // BRANCH TO JUMP_0 UNLESS RESULT OF MODULO OPERATION IS ZERO

15           LD BUF1 +3            // ADDITIONALLY LOAD THREE PIECES OF DATA INTO RING BUFFER #1

16           DEC R2                // DECREMENT R2, WHICH IS LOOP COUNTER FOR NUMBER OF PIECES OF OUTPUT DATA (#16)

17           BNZ LOOP_16           // BRANCH TO LOOP_16 UNLESS LOOP COUNTER R2 IS ZERO

18 JUMP_0:   SUB R0 R0 #35         // R0=R0-35

19           LD BUF1 #9 [R0]       // LOAD DATA (BUFFER SIZE = 9) INTO RING BUFFER #1

20           DEC R2                // DECREMENT R2, WHICH IS LOOP COUNTER FOR NUMBER OF PIECES OF OUTPUT DATA (#16)

21           BNZ LOOP_16           // BRANCH TO LOOP_16 UNLESS LOOP COUNTER R2 IS ZERO

22 END:      HALT
```

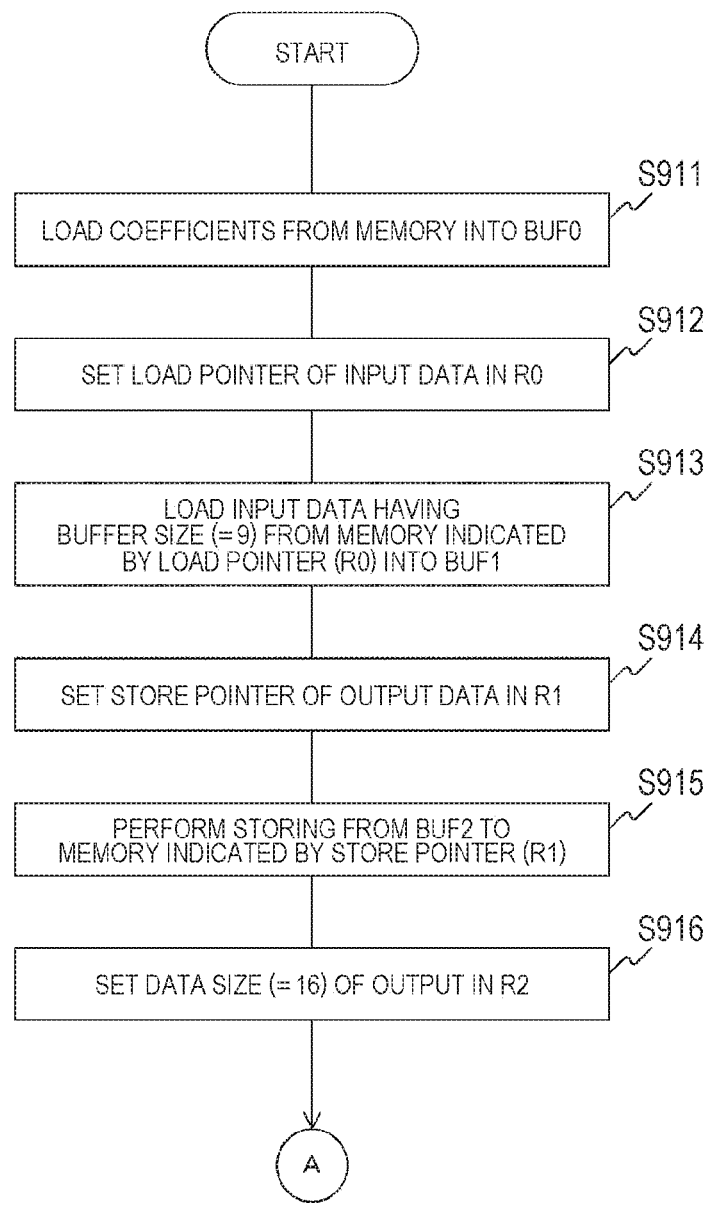

PROCESSOR AND INFORMATION PROCESSING SYSTEM FOR INSTRUCTIONS THAT DESIGNATE A CIRCULAR BUFFER AS AN OPERAND

CROSS REFERENCE TO RELATED APPLICATIONS

This application is a U.S. National Phase of International Patent Application No. PCT/JP2018/025667 filed on Jul. 6, 2018, which claims priority benefit of Japanese Patent Application No. JP 2017-160812 filed in the Japan Patent Office on Aug. 24, 2017. Each of the above-referenced applications is hereby incorporated herein by reference in its entirety.

TECHNICAL FIELD

The present technology relates to a processor that performs a predetermined operation on data loaded from a memory.

BACKGROUND ART

In a recent load store architecture represented by a reduced instruction set computer (RISC), an instruction set architecture is simplified by limiting instructions that access a memory to a load instruction and a store instruction. That is, in an instruction other than the load instruction and the store instruction, only a register can be designated as an operand, and a memory address and an offset of the memory address cannot be designated. This separates, for example, the load instruction that reads data from a memory into a register and an operation instruction that executes an operation, whereby it is possible to eliminate the data waiting time in an instruction that refers to the register and facilitate instruction scheduling for speeding up by a compiler. For example, a processor that performs operation processing based on the load store architecture has been proposed (see, for example, Patent Document 1).

CITATION LIST

Patent Document

Patent Document 1: Japanese Patent Application Laid-Open No. 2006-154979

SUMMARY OF THE INVENTION

Problems to be Solved by the Invention

In the above-mentioned prior art, a series of processing tasks proceeds by repeating the processing of performing an operation on the loaded data and then storing the resultant data in the memory. However, in a case where a filter coefficient and data are repeatedly referred to as in a filter operation, it is necessary to load again the filter coefficient and data that have been referred to once, from the memory. Therefore, the number of instructions increases due to, for example, the number of memory accesses to load/store data and the address calculation of the memory to load from/store to, resulting in a difficulty that processing time and power consumption increase.

The present technology has been created in view of such a situation, and an object thereof is to supply data in a circular manner and suppress overlapping memory accesses in a processor.

Solutions to Problems

The present technology has been made to resolve the above-described difficult points, and a first aspect of the present technology is a processor including: a circular buffer that holds a plurality of pieces of data and reads the plurality of pieces of data in circulation; and an instruction executing part that executes an instruction that designates the circular buffer as an operand, and an information processing system including the processor. This brings about the action that data is supplied in a circular manner from the circular buffer in the execution of the instruction by the processor.

Furthermore, in this first aspect, the instruction executing part may include a load store unit that loads data from a memory into the circular buffer, or stores data held in the circular buffer to the memory. This brings about the action that data is transferred between the circular buffer and the memory.

In addition, in this first aspect, the load store unit may additionally load data into a part of the circular buffer. This brings about the action that data is supplied in a circular manner from the circular buffer while data is added.

In addition, in this first aspect, the instruction executing part may include an operation unit that performs an operation using the circular buffer as an operand. This brings about the action that data is supplied in a circular manner from the circular buffer to the operation unit. In this case, the operation unit may perform an operation between pieces of data held in a plurality of the circular buffers and furthermore, may perform an operation of data held in the circular buffer and data held in a general-purpose register. For example, the operation unit may perform a multiply-add operation between pieces of data held in a plurality of the circular buffers. Besides, the operation unit may execute a filter operation between a filter coefficient held in one of the circular buffers and target data held in another one of the circular buffers, and may cause still another one of the circular buffers to hold an operation result of the filter operation.

In addition, in this first aspect, the instruction executing part may include a data transfer unit that transfers data between the circular buffer and a general-purpose register. This brings about the action that data is transferred between the circular buffer and the general-purpose register.

In addition, in this first aspect, the circular buffer may include: a shift register made up of registers at a plurality of stages; and a circulation selector that circulates data output from the shift register in the shift register, or inputs new data to the shift register. In this case, the shift register may include a shift selector that controls whether or not data held in the registers at the plurality of stages is advanced to next stages, and whether or not data input from the circulation selector is held in one of the registers at an arbitrary stage out of the registers at the plurality of stages.

Effects of the Invention

According to the present technology, it is possible to achieve an excellent effect that data can be supplied in a circular manner and overlapping memory accesses can be suppressed in a processor. Note that the effects described herein are not necessarily limited and any effects described in the present disclosure may be applied.

BRIEF DESCRIPTION OF DRAWINGS

FIG. 4 is a diagram illustrating an example of data held in the ring buffer 150 viewed from software in the embodiment of the present technology.

FIG. 5 is a diagram illustrating an example of an instruction set of the processor 100 according to the embodiment of the present technology.

FIG. 6 is a diagram illustrating an application example of the information processing system according to the embodiment of the present technology to a two-dimensional image filter operation.

FIG. 7 is a diagram illustrating a data reference relationship in the application example of the embodiment of the present technology to the two-dimensional image filter operation.

FIG. 8 is a diagram illustrating a program example in the application example of the embodiment of the present technology to the two-dimensional image filter operation.

FIG. 9 is a first half of a flowchart illustrating an example of a processing procedure in the application example of the embodiment of the present technology to the two-dimensional image filter operation.

MODE FOR CARRYING OUT THE INVENTION

Modes for carrying out the present technology (hereinafter, referred to as embodiments) will be described below. The description will be given in the following order.
1. Embodiment (Example of Processor Configuration)
2. Application Example (Application Example of Filter Operation)

1. Embodiment

[Configuration of Information Processing System]

Figure 1:
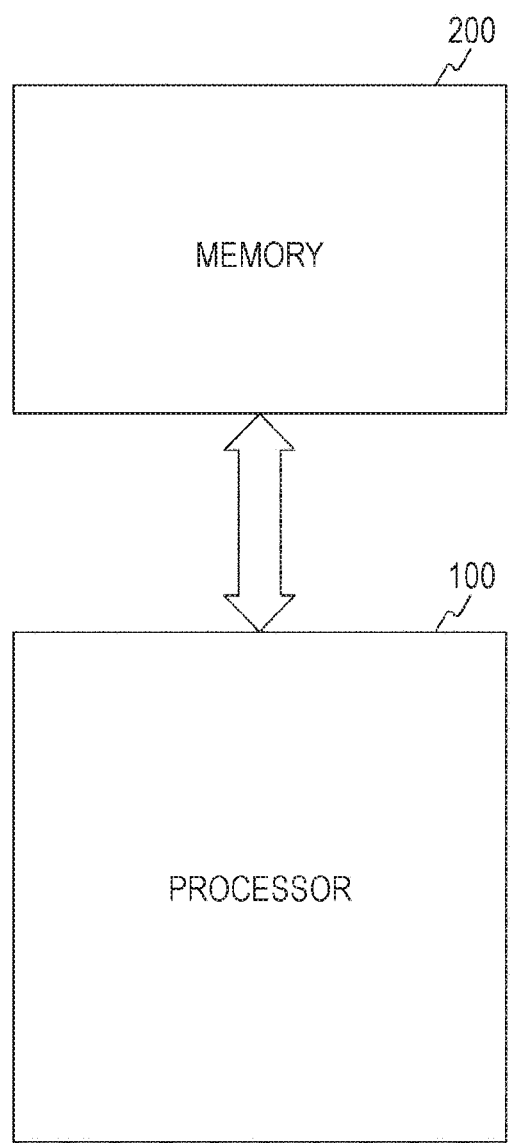
FIG. 1 is a diagram illustrating a configuration example of an information processing system according to an embodiment of the present technology.

FIG. 1 is a diagram illustrating a configuration example of an information processing system according to an embodiment of the present technology. This information processing system includes a processor 100 and a memory 200. The processor 100 is a processor that executes a program made up of an instruction sequence dependent on a predetermined instruction set. The memory 200 is a memory that keeps in storage a program executed by the processor 100 and data necessary for executing the program.

The processor 100 fetches each instruction of the program kept in storage in the memory 200 from the memory 200 and decodes the fetched instruction. Then, the processor 100 executes each instruction in accordance with the result of the decoding. Furthermore, the processor 100 loads data necessary for executing the instruction from the memory 200, and thereafter stores the processed data to the memory 200.

Figure 2:
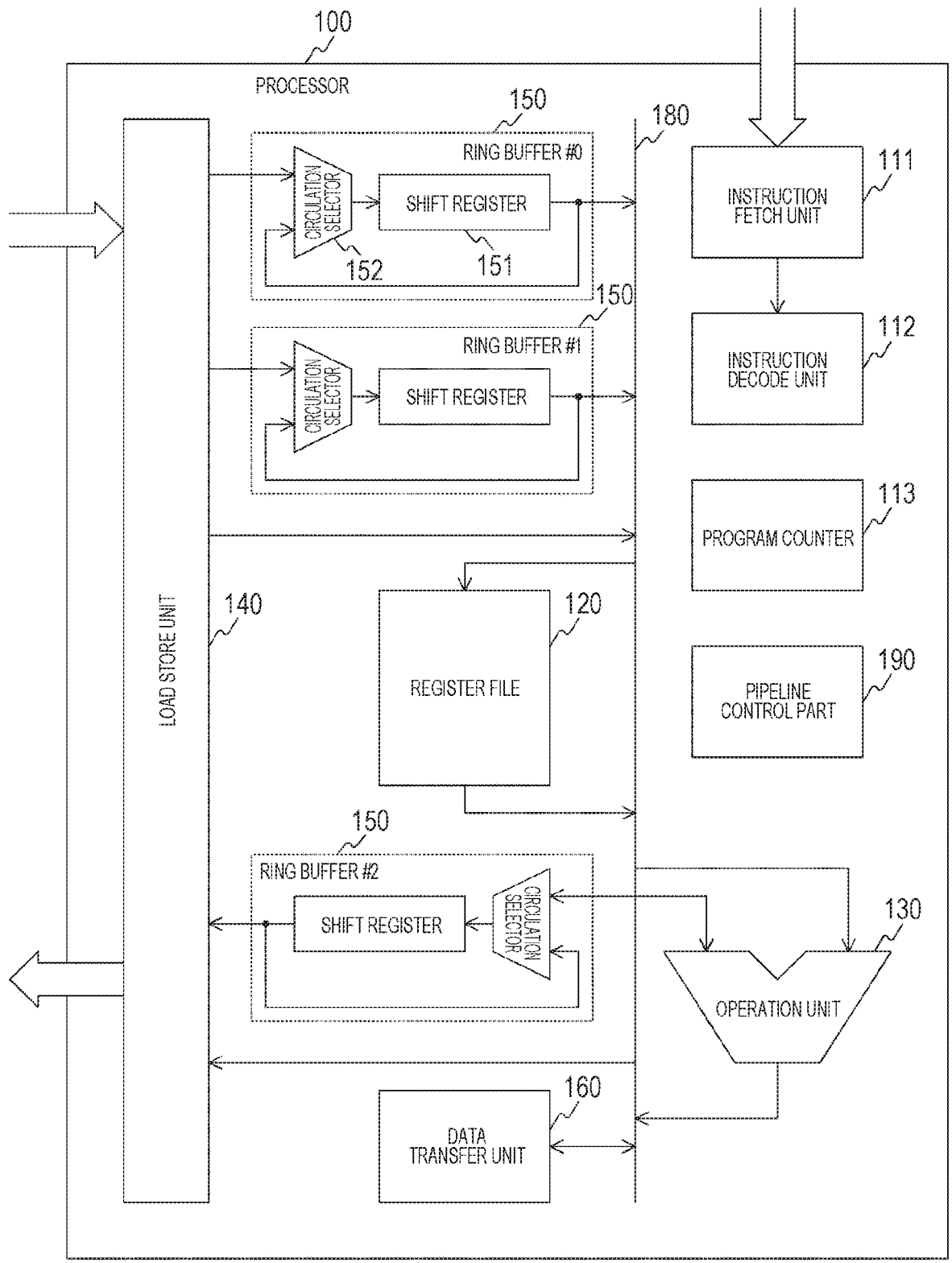
FIG. 2 is a diagram illustrating a configuration example of a processor 100 according to the embodiment of the present technology.

FIG. 2 is a diagram illustrating a configuration example of the processor 100 according to the embodiment of the present technology. This processor 100 includes, as control system units, an instruction fetch unit 111, an instruction decode unit 112, a program counter 113, and a pipeline control part 190. Furthermore, the processor 100 includes a register file 120, an operation unit 130, a load store unit 140, a ring buffer 150, and a data transfer unit 160.

The instruction fetch unit 111 fetches an instruction from the memory 200. The instruction decode unit 112 decodes the fetched instruction. The program counter 113 indicates the address of an instruction to be executed in the program. The pipeline control part 190 controls the instruction pipeline of the processor 100.

The register file 120 is a general-purpose register referred to as an instruction operand. For example, about several words to several tens of words (in some cases, one hundred and tens of words) of 32-bit or 64-bit data are set as a general-purpose register.

The operation unit 130 is an executing part that performs an operation designated in an operation instruction. For example, the applicable types of operations include four arithmetic operations, namely, addition, subtraction, multiplication, and division, but a multiply-add operation and the like combining these operations are also assumed. In addition to the register file 120, the ring buffer 150 can be designated as an operand of the operation instruction.

The load store unit 140 is a memory access part that loads data from the memory 200 or stores data to the memory 200. In addition to the register file 120, the ring buffer 150 can be designated as a destination in which the loaded data is saved and a source from which the data to be stored is supplied.

The ring buffer 150 is a buffer in which data can be referred to in a circular manner. This ring buffer 150 includes a shift register 151 and a circulation selector 152. The shift register 151 is a register having a function of sequentially shifting data held in registers at a plurality of stages in synchronization with a clock. The circulation selector 152 is a selector that makes a selection such that data output from the shift register 151 is circulated in the shift register 151 or new data is input to the shift register 151. With this configuration, the ring buffer 150 can hold data and refer to the same data in a circular manner in accordance with the instruction. A plurality of ring buffers 150 may be prepared. In this example, two ring buffers (#0 and #1) for loading and one ring buffer (#2) for storing are provided as the ring buffers 150.

The data transfer unit 160 is a transfer part that transfers data between registers and, in particular, transfers data between the register file 120 and the ring buffer 150. With this function, data held in the ring buffer 150 can be expanded into the general-purpose register, or data in the general-purpose register can be accumulated in the ring buffer 150.

Note that the load store unit 140 is an example of a circular buffer described in the claims. Furthermore, the operation unit 130, the load store unit 140, or the data transfer unit 160 is an example of an instruction executing part described in the claims.

[Ring Buffer]

Figure 3:
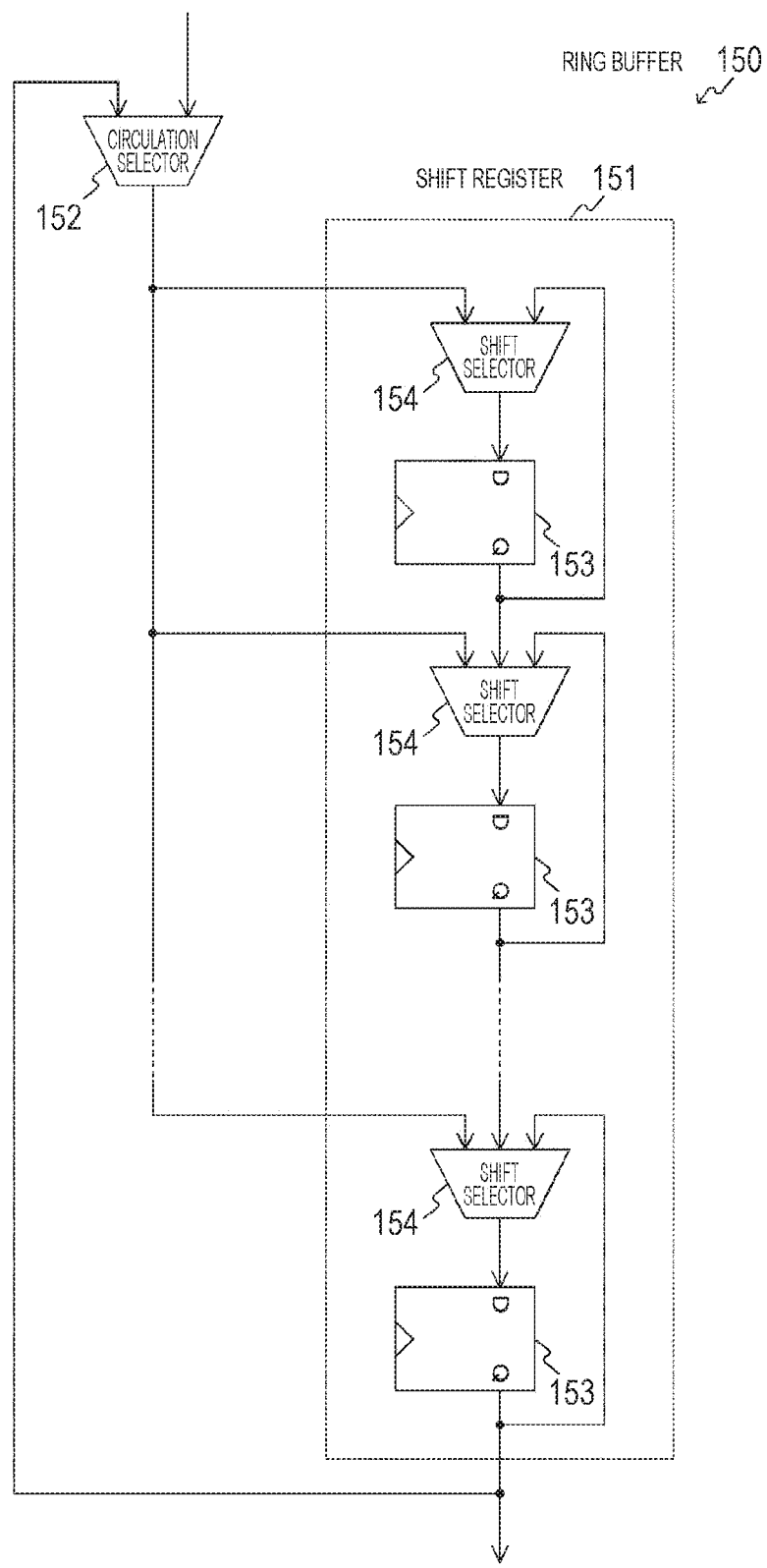
FIG. 3 is a diagram illustrating a configuration example of a ring buffer 150 according to the embodiment of the present technology.

FIG. 3 is a diagram illustrating a configuration example of the ring buffer 150 according to the embodiment of the present technology. This ring buffer 150 includes the shift register 151 and the circulation selector 152 as described above. Additionally, the shift register 151 is made up of registers 153 at a plurality of stages, and a shift selector 154 is provided at the input of each register 153.

In the shift register 151, the output of each register 153 is input to the shift selector 154 at the next stage and also input to the shift selector 154 of its own input part. With this configuration, it is possible to select whether the data held in the register 153 is shifted to the next stage or maintained at the own stage.

Furthermore, the output of the register 153 at the final stage of the shift register 151 is input to the circulation selector 152. The circulation selector 152 selects either the output of the register 153 at the final stage or new data, and outputs the selected data to the shift selector 154. Each of the shift selectors 154 can select an output from the circulation selector 152. With this configuration, a ring buffer that circulates at an arbitrary length can be formed. In addition, new data can also be set in the arbitrary register 153. These workings can be designated in the instruction as will be described later.

FIG. 4 is a diagram illustrating an example of data held in the ring buffer 150 viewed from software in the embodiment of the present technology. In this example, a ring buffer with a circulation length of eight is assumed.

Data #0 is held at a top read position 158. This means that data #0 is physically held in the register 153 at the final stage. Thereafter, the top read position 158 moves clockwise. With this movement, data #1 is assigned to the top read position 158. This means that data #1 is physically held in the register 153 at the final stage. At this time, data #0 is held in the eighth-stage register 153 at the end via the circulation selector 152. Thereafter, the top read position 158 likewise moves clockwise.

After data #7 is assigned to the top read position 158, the top read position 158 is placed at data #0 again. By controlling in this manner, eight pieces of data can be referred to in a circular manner.

Furthermore, since new data can be added to this ring buffer 150, it is possible to repeatedly refer to the ring buffer 150 a predetermined number of times while performing update to new data. This is particularly useful for a filter operation or the like as will be described later.

[Instruction Set]

FIG. 5 is a diagram illustrating an example of an instruction set of the processor 100 according to the embodiment of the present technology. Here, instructions relating to the ring buffer 150 are particularly illustrated.

A load (LD) instruction is an instruction for loading data from the memory 200. The format of "LD BUFn size [address]" means that data with an amount of "size" words is loaded from "address" of the memory 200 into the n-th ring buffer 150. Furthermore, the format of "LD BUFn+ size" means that data with an amount of "size" words is added from the memory 200 to the n-th ring buffer 150 to be loaded. Note that this LD instruction is a non-blocking instruction that can execute a subsequent instruction without waiting for the completion of this instruction.

A store (ST) instruction is an instruction for storing data in the memory 200. The format of "ST BUFn size [address]" means that data with an amount of "size" words is stored from the n-th ring buffer 150 to "address" of the memory 200. Note that this ST instruction is a non-blocking instruction that can execute a subsequent instruction without waiting for the completion of this instruction.

A move (MOV) instruction is an instruction that transfer data between registers. The format of "MOV BUFn Rn" means that data is transferred from the n-th general-purpose register to the n-th ring buffer 150. The format of "MOV Rn BUFn" means that data is transferred from the n-th ring buffer 150 to the n-th general-purpose register.

A multiply accumulate (MAC) instruction is an instruction that performs a multiply-add operation. The format of "MAC Rn BUFi BUFj" means that the result of accumulating and adding the multiplication results of the i-th and j-th ring buffers 150 is saved in the n-th general-purpose register. Note that this MAC is an example of the operation instruction, and a variety of operation instructions such as addition between the ring buffers 150 can be provided.

2. Application Example

[Application Example to Two-Dimensional Image Filter Operation]

FIG. 6 is a diagram illustrating an application example of the information processing system according to the embodiment of the present technology to a two-dimensional image filter operation. Here, a program that executes a two-dimensional image filter operation indicated by following formulas is assumed.

$$f(x, y) = \sum_{n=-1}^{1} \sum_{m=-1}^{1} p(x, y) \, coef(m, n) \quad \text{[Mathematical Formula 1]}$$

$$coef(m, n) = \begin{vmatrix} -1 & -1 & -1 \\ -1 & 9 & -1 \\ -1 & -1 & -1 \end{vmatrix} \quad \text{[Mathematical Formula 2]}$$

In this example, an input p(x, y) is defined to be input data in_data, and an output f(x, y) is defined to be output data out_data. Filter coefficients coef represent a 3×3 two-dimensional filter, and a multiply-add operation with the input data in_data is performed using this two-dimensional filter as a unit. The input data in_data is saved in the ring buffer #1, and the filter coefficients coef are saved in the ring buffer #0. Furthermore, the output data out_data is saved in the ring buffer #2.

After the operation result "−5" of the first 3×3 multiply-add operation is obtained, the next 3×3 operation result "5" is obtained by shifting downward by one row in the input data in_data. Downward shifts are further made twice, during which time the operation results "−3" and "−3" are obtained. Thereafter, by returning back to the topmost row and shifting rightward by one column, the next 3×3 operation result "2" is obtained. Similar workings are repeated and the last operation result "9" is obtained.

FIG. 7 is a diagram illustrating a data reference relationship in the application example of the embodiment of the present technology to the two-dimensional image filter operation.

The filter coefficients coef are nine elements of 3×3, and the same elements are referred to every time repetition is made. Therefore, the filter coefficients coef are circularly referred to with the buffer size "9" in the ring buffer #0.

Furthermore, the input data in_data is replaced with data of which a certain part is different each time repetition is made. Therefore, the input data in_data is circularly referred to while additional loading is repeated in the ring buffer #1. That is, the fourth to ninth pieces of data among the nine pieces of data are circularly referred to, and the top three pieces of data are replaced with new data by additional loading. After that, the circular reference is performed in the same way.

FIG. 8 is a diagram illustrating a program example in the application example of the embodiment of the present technology to the two-dimensional image filter operation.

An LD instruction on the first line is an instruction that loads the nine filter coefficients coef from the memory 200 into the ring buffer #0. A label BEGIN indicates the beginning of this program. "#9" means an immediate value "9" of the buffer size.

A MOV instruction on the second line is an instruction that sets the load pointer of the input data in_data in a general-purpose register R0. This value is referred to in the load instructions for the input data in_data (third and nineteenth lines).

An LD instruction on the third line is an instruction that loads the input data in_data from the memory 200 into the ring buffer #1 having the buffer size "9". "#9" means an immediate value "9" of the buffer size.

A MOV instruction on the fourth line is an instruction that sets the store pointer of the output data out_data in a general-purpose register R1. This value is referred to in the store instruction for the output data out_data (fifth line).

An ST instruction on the fifth line is an instruction that stores, in the memory 200, the ring buffer #2, in which the operation result is to be saved later as output data out_data. Since the designation of the buffer size is omitted here, the buffer size is assigned as infinite length, and the ring buffer #2 performs a first-in first-out (FIFO) working. Note that this ST instruction presets the initial address of the memory 200, and the timing at which the operation result is stored in the memory 200 after it is saved depends on the implementation of the information processing system. Since the management of the address pointer is automatically executed in the ring buffer #2, the management of the address pointer becomes unnecessary by performing the initial setting with this ST instruction.

A MOV instruction on the sixth line is an instruction that sets the number of pieces of data "16" of the output data out_data in a general-purpose register R2 as a loop counter.

A MOV instruction on the seventh line is an instruction that sets the size "9" of the filter coefficients coef in a general-purpose register R3 as a loop counter. A label LOOP_16 indicates a jump destination of a loop formed by a branch instruction on the seventeenth line.

A MOV instruction on the eighth line is an instruction that clears a general-purpose register R4, in which the operation result is saved, to zero.

A MAC instruction on the ninth line is a multiply-add operation instruction that performs a filter operation, and saves the result of accumulating and adding the multiplication results of the ring buffer #0 and the ring buffer #1 to the general-purpose register R4. A label LOOP_9 indicates a jump destination of a loop formed by a branch instruction on the eleventh line.

A DEC instruction on the tenth line is a decrement instruction that subtracts "1" from the general-purpose register R3, which is a loop counter.

A BNZ instruction on the eleventh line is a branch instruction that branches to the label LOOP_9 unless the value of the general-purpose register R3 is zero. Accordingly, the instructions on the ninth line and the tenth line are each repeated nine times.

A MOV instruction on the twelfth line is an instruction that transfers the general-purpose register R4, in which the filter operation result is saved, to the ring buffer #2.

A MOD instruction on the thirteenth line is a remainder calculation instruction that sets, in a general-purpose register R5, a remainder obtained by dividing the general-purpose register R2, which is a loop counter for the number of pieces of the output data, by "4".

A BNZ instruction on the fourteenth line is a branch instruction that branches to the eighteenth line with a label JUMP_0 unless the result of the remainder calculation in the MOD instruction on the thirteenth line is zero. The 3×3 operation on the input data in_data is executed four times while shifting by one row at a time, and thereafter the 3×3 operation shifted by one column is executed again by returning back to the top row. In order to perform these four operations as one group, a branch is performed by this BNZ instruction.

An LD instruction on the fifteenth line is an instruction that additionally loads new input data in_data from the memory 200 into the ring buffer #1. As described above, while six pieces of data among nine pieces of data are continuously referred to in circulation, three new pieces of data need to be added. Three new pieces of data are additionally loaded by this LD instruction.

A DEC instruction on the sixteenth line is a decrement instruction that subtracts "1" from the general-purpose register R2, which is a loop counter for the number of pieces of the output data.

A BNZ instruction on the seventeenth line is a branch instruction that branches to the label LOOP_16 unless the value of the general-purpose register R2, which is a loop counter for the number of pieces of the output data, is zero. Accordingly, the instructions from the seventh line to the fourteenth line are each repeated sixteen times.

A SUB instruction on the eighteenth line is an instruction that subtracts "35" from the general-purpose register R0, which is the load pointer of the input data in_data. With this instruction, the load pointer is reset from the end to the top of the input data in_data. The label JUMP_0 represents a jump destination of the branch instruction on the fourteenth line.

An LD instruction on the nineteenth line is an instruction that loads the input data in_data from the memory 200 into the ring buffer #1 having the buffer size "9".

A DEC instruction on the twentieth line is a decrement instruction that subtracts "1" from the general-purpose register R2, which is a loop counter for the number of pieces of the output data.

A BNZ instruction on the twenty-first line is a branch instruction that branches to the label LOOP_16 unless the general-purpose register R2, which is a loop counter for the number of pieces of the output data, is zero.

The twenty-second line indicates a HALT instruction, and the execution of the program from the label BEGIN to the label END ends.

Figure 10:
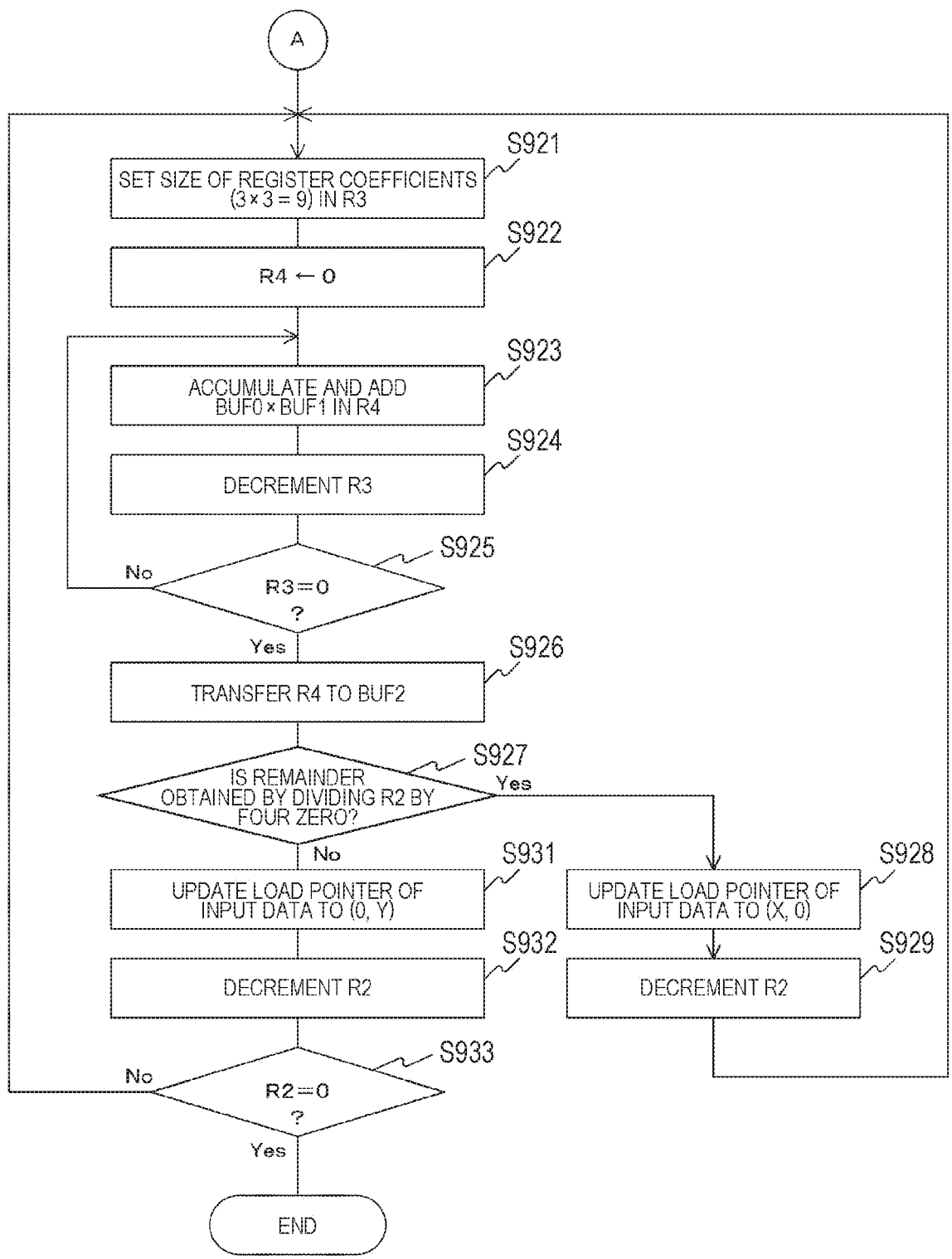
FIG. 10 is a latter half of a flowchart illustrating an example of a processing procedure in the application example of the embodiment of the present technology to the two-dimensional image filter operation.

FIGS. 9 and 10 are flowcharts illustrating an example of a processing procedure in the application example of the embodiment of the present technology to the two-dimensional image filter operation.

First, the nine filter coefficients coef are loaded from the memory 200 into the ring buffer #0 by the LD instruction on the first line (step S911). Then, the load pointer of the input data in_data is set in the general-purpose register R0 by the MOV instruction on the second line (step S912).

Furthermore, the input data in_data is loaded from the memory 200 into the ring buffer #1 having the buffer size "9" by the LD instruction on the third line (step S913). Then, the store pointer of the output data out_data is set in the general-purpose register R1 by the MOV instruction on the fourth line (step S914).

In addition, the ring buffer #2, in which the operation result is to be saved later as output data out_data, is stored to the memory 200 by the ST instruction on the fifth line (step S915). Then, the number of pieces of data "16" of the output data out_data is set in the general-purpose register R2 as a loop counter by the MOV instruction on the sixth line (step S916).

Thereafter, a loop of the number of pieces of the output data "16" is entered, and the size "9" of the filter coefficients coef is set in the general-purpose register R3 as a loop counter by the MOV instruction on the seventh line (step S921). The general-purpose register R4, in which the operation result is saved, is cleared to zero by the MOV instruction on the eighth line (step S922).

The result of accumulating and adding the multiplication results of the ring buffer #0 and the ring buffer #1 is saved to the general-purpose register R4 by the MAC instruction on the ninth line (step S923). Then, "1" is subtracted from the general-purpose register R3, which is a loop counter, by the DEC instruction on the tenth line (step S924). If the value of this general-purpose register R3 is not zero in the BNZ instruction on the eleventh line (step S925: No), the processing in step S923 and succeeding steps is repeated. When the value of the general-purpose register R3 becomes zero (step S925: Yes), the processing proceeds to next step S926.

The general-purpose register R4, in which the filter operation result is saved, is transferred to the ring buffer #2 by the MOV instruction on the twelfth line (step S926). Then, a remainder obtained by dividing the general-purpose register R2, which is a loop counter for the number of pieces of the output data, by "4" is found by the MOD instruction on the thirteenth line. As a result, if the result of the remainder calculation is zero (step S927: Yes), new input data in_data is additionally loaded from the memory 200 into the ring buffer #1 by the LD instruction on the fifteenth line (step S928). Furthermore, the DEC instruction on the sixteenth line subtracts "1" from the general-purpose register R2, which is a loop counter for the number of pieces of the output data (step S929). Thereafter, the processing in step S921 and succeeding steps is repeated.

On the other hand, if the result of the remainder calculation on the thirteenth line is not zero (step S927: No), "35" is subtracted from the general-purpose register R0, which is the load pointer of the input data in_data, by the SUB instruction on the eighteenth line (step S931). Then, the input data in_data is loaded from the memory 200 into the ring buffer #1 having the buffer size "9" by the LD instruction on the nineteenth line. In addition, "1" is subtracted from the general-purpose register R2, which is a loop counter for the number of pieces of the output data, by the DEC instruction on the twentieth line (step S932). As a result, if the general-purpose register R2, which is a loop counter for the number of pieces of the output data, is not zero (step S933: No), the processing in step S921 and succeeding steps is repeated by the BNZ instruction on the twenty-first line. When the general-purpose register R2, which is a loop counter for the number of pieces of the output data, becomes zero (step S933: Yes), the processing ends.

As described above, according to the embodiment of the present technology, by providing an instruction set that designates the ring buffer 150 as an operand in the processor 100, it is possible to supply data in a circular manner and suppress overlapping memory accesses. For example, the number of instructions and the number of memory accesses can be reduced when processing such as a multidimensional filter operation is executed. Furthermore, this can also reduce processing time and power consumption.

Note that the above-described embodiments illustrate examples for embodying the present technology and matters in the embodiments and invention specifying matters in the claims individually have correspondence relationships. Likewise, the invention specifying matters in the claims and the matters in the embodiments of the present technology denoted by the same names as those in the claims individually have correspondence relationships. However, the present technology is not limited to the embodiments and can be embodied by subjecting the embodiments to various modifications without departing from the gist thereof.

Furthermore, the processing procedures described in the above embodiments may be regarded as a method having these series of procedures and additionally, may be regarded as a program for causing a computer to execute these series of procedures or as a recording medium keeping the program in storage. As this recording medium, for example, a compact disc (CD), a mini disc (MD), a digital versatile disc (DVD), a memory card, a Blu-ray (registered trademark) disc, or the like can be used.

Note that the effects described in the present description merely serve as examples and not construed to be limited. Furthermore, there may be another effect as well.

In addition, the present technology can be also configured as described below.

(1) A processor including:

a circular buffer that holds a plurality of pieces of data and reads the plurality of pieces of data in circulation; and an instruction executing part that executes an instruction that designates the circular buffer as an operand.

(2) The processor according to (1) above, in which the instruction executing part includes a load store unit that loads data from a memory into the circular buffer, or stores data held in the circular buffer to the memory.

(3) The processor according to (2) above, in which the load store unit additionally loads data into a part of the circular buffer.

(4) The processor according to any one of (1) to (3) above, in which the instruction executing part includes an operation unit that performs an operation using the circular buffer as an operand.

(5) The processor according to (4) above, in which the operation unit performs an operation between pieces of data held in a plurality of the circular buffers.

(6) The processor according to (5) above, in which the operation unit performs a multiply-add operation between pieces of data held in a plurality of the circular buffers.

(7) The processor according to (5) above, in which the operation unit executes a filter operation between a filter coefficient held in one of the circular buffers and target data held in another one of the circular buffers, and causes still another one of the circular buffers to hold an operation result of the filter operation.

(8) The processor according to any one of (4) to (7) above, in which the operation unit performs an operation of data held in the circular buffer and data held in a general-purpose register.

(9) The processor according to any one of (1) to (8) above, in which the instruction executing part includes a data transfer unit that transfers data between the circular buffer and a general-purpose register.

(10) The processor according to any one of (1) to (9) above, in which the circular buffer includes:

a shift register made up of registers at a plurality of stages; and a circulation selector that circulates data output from the shift register in the shift register, or inputs new data to the shift register.

(11) The processor according to (10) above, in which the shift register includes a shift selector that controls whether or not data held in the registers at the plurality of stages is advanced to next stages, and whether or not data input from the circulation selector is held in one of the registers at an arbitrary stage out of the registers at the plurality of stages.

(12) An information processing system including:

a memory;

a circular buffer that holds a plurality of pieces of data loaded from the memory and reads the plurality of pieces of data in circulation; and an instruction executing part that executes an instruction that designates the circular buffer as an operand.

REFERENCE SIGNS LIST

100 Processor
111 Instruction fetch unit
112 Instruction decode unit
113 Program counter
120 Register file
130 Operation unit
140 Load store unit
150 Ring buffer
151 Shift register
152 Circulation selector
153 Register
154 Shift selector
160 Data transfer unit
190 Pipeline control part
200 Memory

The invention claimed is:

1. A processor, comprising:
a first circular buffer that includes:
a shift register that includes a plurality of shift selectors and a plurality of specific registers at a plurality of stages, wherein
each specific register of the plurality of specific registers and each shift selector of the plurality of shift selectors correspond to a respective stage of the plurality of stages,
a specific register of the plurality of specific registers is configured to output first data to a first shift selector of the plurality of shift selectors and a second shift selector of the plurality of shift selectors,
the specific register and the first shift selector are in a first stage of the plurality of stages, and
the second shift selector is in a second stage of the plurality of stages; and
a circulation selector configured to one of input new data to the shift register or circulate the first data; and
an instruction executing part configured to execute an instruction that designates the first circular buffer as an operand.

2. The processor according to claim 1, wherein
the instruction executing part includes a load store unit, and
the load store unit is configured to one of:
load second data from a memory into the first circular buffer, or
store the first data to the memory.

3. The processor according to claim 2, wherein the load store unit is further configured to load the second data into the circulation selector.

4. The processor according to claim 1, wherein
the instruction executing part includes an operation unit, and
the operation unit is configured to execute an operation based on the first circular buffer as the operand.

5. The processor according to claim 4, further comprising a plurality of circular buffers configured to hold a plurality of pieces of data, wherein the operation unit is further configured to execute the operation between the plurality of pieces of data held in the plurality of circular buffers.

6. The processor according to claim 5, wherein the operation unit is further configured to execute a multiply-add operation between the plurality of pieces of data held in the plurality of circular buffers.

7. The processor according to claim 5, wherein
the first circular buffer is configured to hold a filter coefficient,
a second circular buffer of the plurality of circular buffers is configured to hold target data, and
the operation unit is further configured to:
execute a filter operation between the filter coefficient and the target data;
cause a third circular buffer of the plurality of circular buffers to hold an operation result of the filter operation.

8. The processor according to claim 4, further comprising a general-purpose register configured to hold second data, wherein
the first circular buffer is configured to hold third data, and
the operation unit is further configured to execute the operation on the second data and the third data.

9. The processor according to claim 1, wherein
the instruction executing part includes a data transfer unit, and
the data transfer unit is configured to transfer second data between the first circular buffer and a general-purpose register.

10. An information processing system, comprising:
a memory;
a circular buffer configured to load specific data from the memory, wherein the circular buffer includes:
a shift register that includes a plurality of shift selectors and a plurality of specific registers at a plurality of stages, wherein
each specific register of the plurality of specific registers and each shift selector of the plurality of shift selectors correspond to a respective stage of the plurality of stages,
a specific register of the plurality of specific registers is configured to output the specific data to a first shift selector of the plurality of shift selectors and a second shift selector of the plurality of shift selectors,
the specific register and the first shift selector are in a first stage of the plurality of stages, and
the second shift selector is in a second stage of the plurality of stages; and
a circulation selector configured to one of input new data to the shift register or circulate the specific data; and an instruction executing part configured to execute an instruction that designates the circular buffer as an operand.

\* \* \* \* \*